United States Patent
Natsuyama (10) Patent No.: US 6,724,445 B2
(45) Date of Patent: Apr. 20, 2004

(54) DISPLAY ELEMENT FRAME FOR A PORTABLE DEVICE

(75) Inventor: Yoshifumi Natsuyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 09/784,998

(22) Filed: Feb. 16, 2001

(65) Prior Publication Data
US 2001/0026334 A1 Oct. 4, 2001

(30) Foreign Application Priority Data

Feb. 16, 2000 (JP) ........................................ 2000-038863

(51) Int. Cl.$^7$ .......................... G02F 1/1333; G06F 1/16
(52) U.S. Cl. .......................... 349/58; 361/759; 361/801
(58) Field of Search ............................ 349/58; 361/759, 361/801; 368/88

(56) References Cited

U.S. PATENT DOCUMENTS 4,405,242 A * 9/1983 Kosaka et al. ................. 368/82

FOREIGN PATENT DOCUMENTS

| JP | 9-304754 | 11/1997 |
| JP | 10-68932 | 3/1998 |
| JP | 10-214047 | 8/1998 |
| JP | 10-319378 | 12/1998 |

\* cited by examiner

Primary Examiner—Tarifur R. Chowdhury
Assistant Examiner—Hoan Nguyen
(74) Attorney, Agent, or Firm—Derek S. Jennings

(57) ABSTRACT

A frame is disclosed for retaining an LCD panel with a liquid crystal material interposed between two glass substrates disposed so as to face each other. The frame has a frame body for placing the panel, an arm oscillatably attached in a planar direction to the frame body, and a stopper formed at the arm so as to be protruded from the frame body and restrict the movement of the planar member in a planar direction.

7 Claims, 9 Drawing Sheets

DISPLAY ELEMENT FRAME FOR A PORTABLE DEVICE

FIELD OF THE INVENTION

The present invention relates to a display element frame preferably used to retain a display element of a liquid crystal display (LCD).

BACKGROUND OF THE INVENTION

In recent years, the spread of liquid crystal displays (LCD) has become widespread as image display devices for personal computers and other various types of monitors. Generally, such a liquid crystal display (LCD) has a back light used as a sheet light source for lighting, which is disposed at the rear side of the LCD panel, so that the light is irradiated in uniform all over the liquid crystal surface having a predetermined area so as to visualize images formed on the LCD surface.

A liquid crystal display (LCD) comprises an LCD panel with a liquid crystal material interposed between two glass substrates; a circuit board mounted on the LCD panel and used to drive the LCD panel; a back light unit disposed on the rear side of the LCD panel with an LCD panel frame therebetween; and an armor frame for covering those items.

Various methods for retaining an LCD panel are disclosed in Published Unexamined Japanese Patent Applications No. 9-304754, No. 10-68932, No. 10-214047, No. 10-319378, etc.

Figure 11:
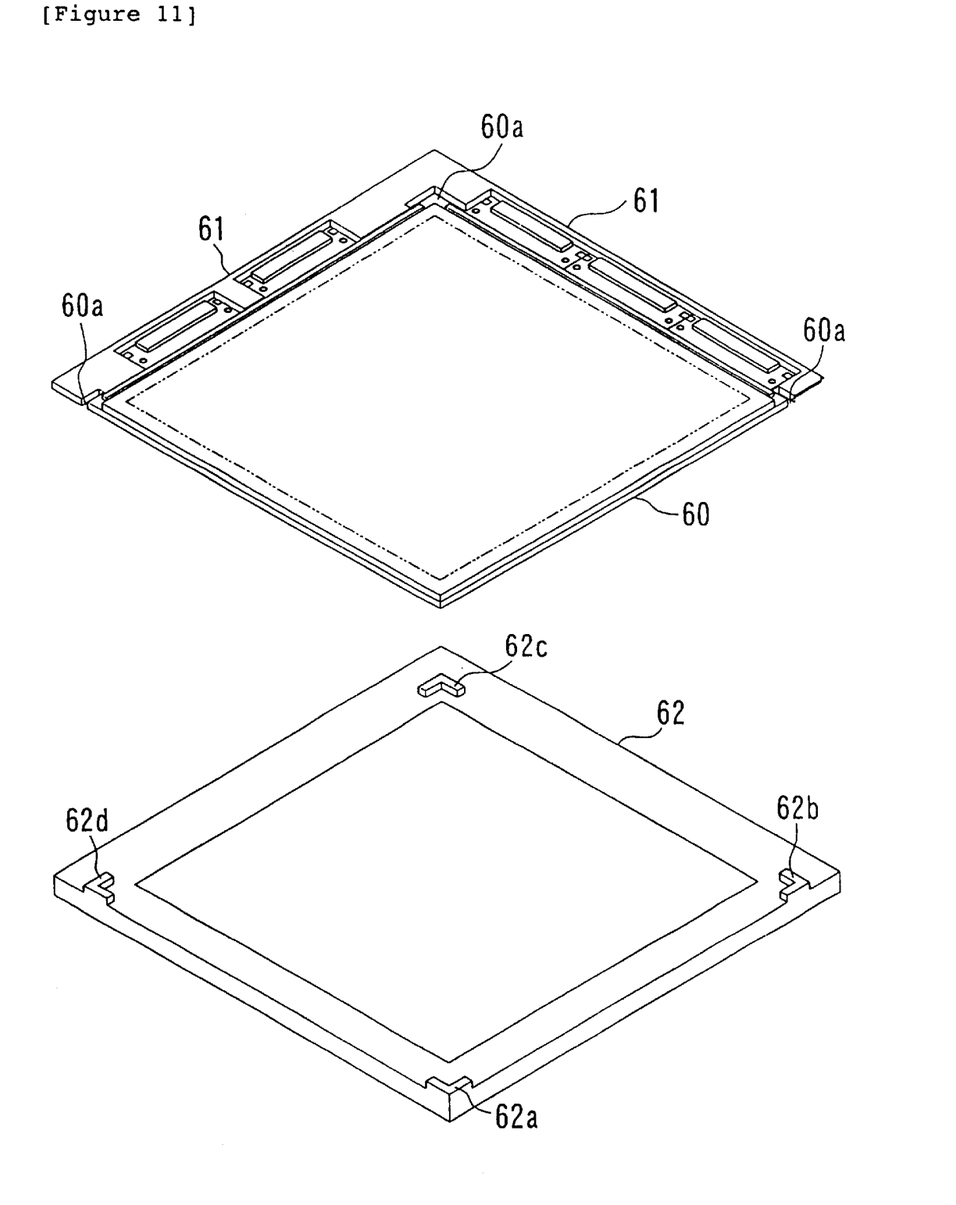
FIG. 11 is an exploded perspective view of a conventional frame and a conventional LCD panel.
Figure 12:
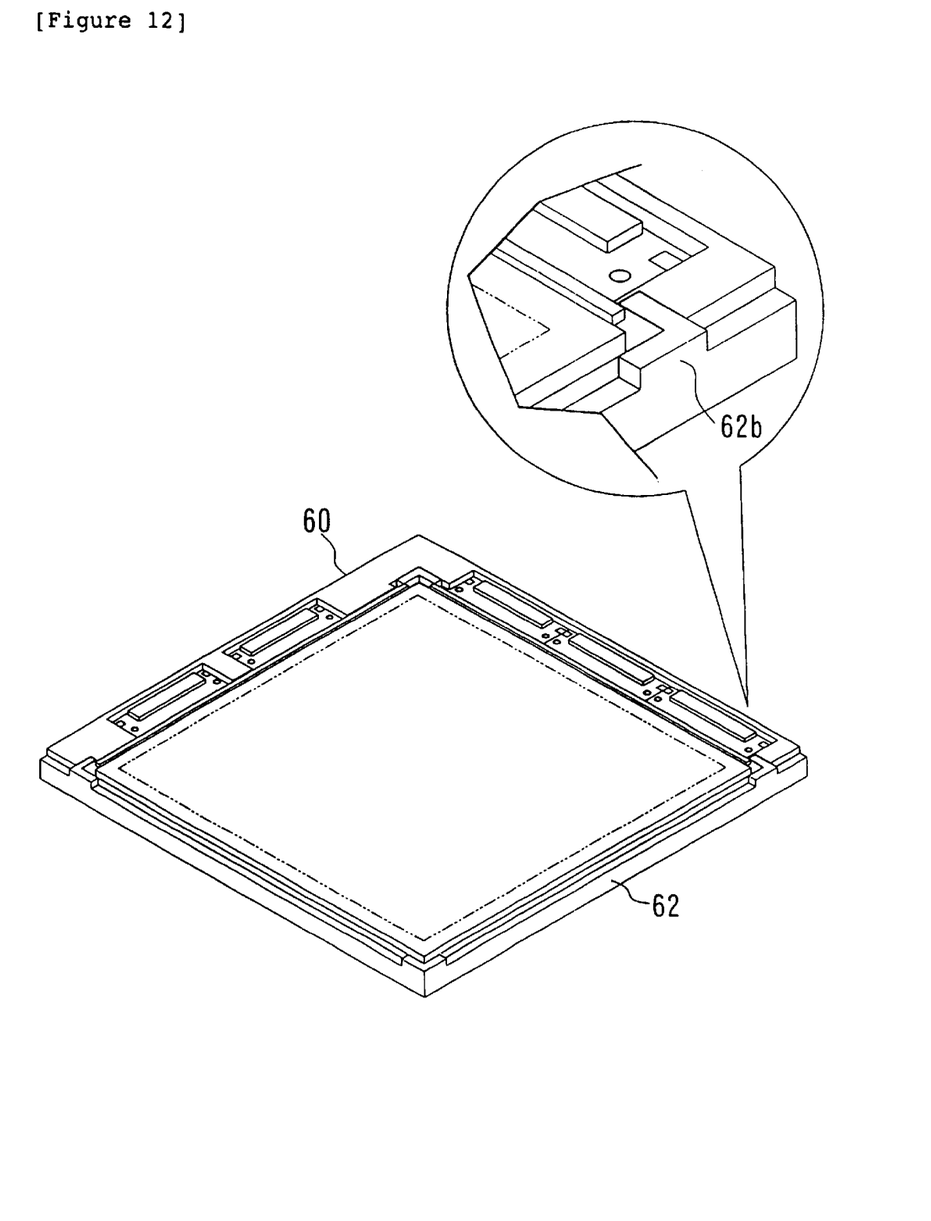
FIG. 12 is a perspective view of the conventional frame and the conventional LCD panel that are put together.

FIGS. 11 and 12 shows one of those methods. In FIGS. 11 and 12, an LCD panel 60 having a circuit board 61, the circuit board 61, and a frame 62 is shown. FIG. 11 shows a case in which the LCD panel 60 and the circuit board 61 are separated from the frame 62 and FIG. 12 shows a case in which the LCD panel 60 is retained by the frame 62.

The frame 62 has stoppers 62a to 62d disposed at the four corners of the frame 62 so as to retain the LCD panel 60. The stopper 62a retains a corner of the LCD panel 60 and the stoppers 62b to 62d retain notches 60a formed at a boundary between the LCD panel 60 and the circuit board 61 respectively.

The frame 62 is a solid molded one made of plastic unitarily with the stoppers 62a to 62d. A predetermined clearance is necessary between each of the stoppers 62a to 62d and the LCD panel 60. Concretely, if the clearance is zero, the LCD panel 60 cannot be stored in the frame 62. On the contrary, if the clearance is excessively large, the LCD panel 60 cannot be retained surely. In addition, if the clearance is large, the LCD panel 60 might cause the LCD panel 60 to hit the stoppers 62a to 62d when a vibration and/or a shock is applied to the frame 62, resulting in a damage of the LCD panel 60 or the stoppers 62a to 62d.

Those problems, however, can be solved if the frame 62 and the LCD panel 60 are formed accurately. In spite of this, because the dimensional accuracy of both plastic composing the frame 62 and glass for composing the LCD panel 60 is not high, it becomes quite expensive to obtain such a high dimensional accuracy. Especially for a large sized liquid crystal display (LCD).

Liquid crystal displays (LCD) have come to be employed more and more for such portable devices as lap-top personal computers. As known well, lap-top personal computers are apt to be affected by vibration and shock more than desk-top personal computers. Even when a proper clearance is secured between each of the stoppers 62a to 62d and the LCD panel, a large vibration/shock, when applied to a lap-top personal computer, might damage the LCD panel 60 or the stoppers 62a to 62d. For example, if a lap-top personal computer falls, the LCD panel 60 will be fatally damaged, resulting in loss of the display element. In order to avoid such damages, the LCD panels 60 employed for portable electronic devices should preferably be retained so as to absorb the vibration/shock more effectively.

Because the stoppers 62a to 62d are made of plastic, they can absorb vibration and shock to a certain degree. If they receive a large vibration/shock they will not be able to absorb the vibration/shock completely. To absorb such vibrations/shocks completely, it became effective to retain the LCD panel 60 in a softer material, for example, rubber stock at the stoppers 62a to 62d. In this case, the LCD panel 60 must have reduced thickness in accordance to the thickness of the stock rubber. This means narrowing the display area of the LCD panel 60. For a liquid crystal display, it is a very important technical concept to reduce the frame in width, that is, to secure a wider display area of the LCD panel 60. Thus, narrowing the display area goes against the technical concept trying to be achieved. In addition, using rubber in such a way will increase the manufacturing cost of the frame 62.

The stoppers 62a to 62d of the conventional frame 62 are formed to compose cantilever beams with respect to the frame 62 as shown in FIGS. 11 and 12. Consequently, a deflection from the fixed end, caused by external forces, causes movement of the LCD panel 60. However, the movement will be very small, since the stoppers 62a to 62d are not so high. Especially, such a movement is not recognized at the lower end, that is, at the fixed end. This is why the frame 62 and the LCD panel 60 have to be manufactured at a high dimensional accuracy respectively and they have been confronted with a problem of weak resistance to vibration/shock as described above.

It is not impossible for the conventional open sided beam type stoppers to have a large movement of the stoppers as described above. However, the present inventor has found that if the LCD panel frame, when formed unitarily with other necessary parts in a certain pattern, enables the stoppers to be moved largely in a planar direction.

The present inventor intends to solve the above problems by providing a frame that can be made of plastic and formed unitarily with other necessary parts, thereby preventing an increase in manufacturing cost of the frame over that of the conventional prior art.

Under such circumstances, it is an object of the present invention to provide a frame capable of retaining an LCD panel properly even when the dimensional accuracy of both frame and LCD panel is low. It is another object of the present invention to provide a frame capable of absorbing a vibration/shock more effectively than the conventional frame even when a large vibration/shock is applied to such a portable device, such as a lap-top personal computer, without reducing the display area.

SUMMARY OF THE INVENTION

A feature of the present invention is to provide a frame for retaining an LCD panel with a liquid crystal material interposed between two glass substrates disposed so as to face each other. The frame has a frame body for placing the panel, an arm attached to the frame body oscillatably in a planar direction of the frame body, and a stopper formed at the arm so as to be protruded from the frame body and restrict the movement of the planar member in a planar direction.

Another feature of the present invention also provides a liquid crystal display (LCD) having an LCD panel composed of two laminated glass substrate. A back light unit is included for irradiating a light to the LCD panel. A frame is disposed between the LCD panel and the back light unit and is used to hold the LCD panel and restrict the movement of the LCD panel in the planar direction. The frame has a rectangular frame body with a predetermined thickness and an arm formed unitarily with the frame body at one of the corners of the frame body so that its one end becomes a fixed end and the other end becomes a free end with respect to the frame body within a range of the thickness of the frame body. A movable stopper is erected at the free end of the arm and is used to restrict the movement of the LCD panel.

Still another feature of the present invention includes a portable device having a rectangular glass substrate for composing a display element, as well as first and second controlling members for controlling the movement of the glass substrate in the planar direction. The first controlling member is disposed at one of the two sides composing a corner of the glass substrate and the second controlling member is provided at the other side. The first and second controlling members are movable in the horizontal direction with respect to the glass substrate.

Hereunder, the preferred embodiments of the present invention will be described with reference to the accompanying drawings.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION OF THE INVENTION

On the frame of the present invention, a void for disposing the arm is formed at the frame body. The arm can be formed so as to be extended from a side wall surrounding the void.

Also on the frame of the present invention, the arm and the stopper should preferably be formed unitarily with the frame body with means of injection molding. This is to achieve the above object of the present invention easily by forming the arm and the stopper unitarily through such the injection molding.

Furthermore, the present invention enables the arm to be formed so that its cross-sectional area is varied in the longitudinal direction. This allows for adjustments in the load for oscillating the arm.

In the liquid crystal display (LCD) of the present invention, the arm should be formed so that its fixed end is positioned inside the frame body and its free end is positioned outside the frame body. This is because the LCD panel can be retained in a larger area than a case in which the positions of the free end and the fixed end are exchanged.

Furthermore, in the liquid crystal display (LCD) of the present invention, the movable stopper can be disposed on part of the LCD panel, where the panel is composed of only one glass substrate. Because such the one-glass-substrate portion is not so strong, the movable stopper can retain the LCD panel more effectively.

According to the present invention, the movable stopper, in cooperation with the fixed stopper fixed to the frame body so as to be erected therefrom, can restrict the movement of the LCD panel. This is because it is insufficient to hold the LCD panel satisfactorily only with the movable stopper when the positioning accuracy of the LCD panel is considered important.

In the portable device of the present invention, the first and second controlling members should preferably move independently of each other and almost orthogonally to each other. In addition, the first and second controlling members should preferably be formed as planes where they come in contact with the glass substrate.

Figure 1:
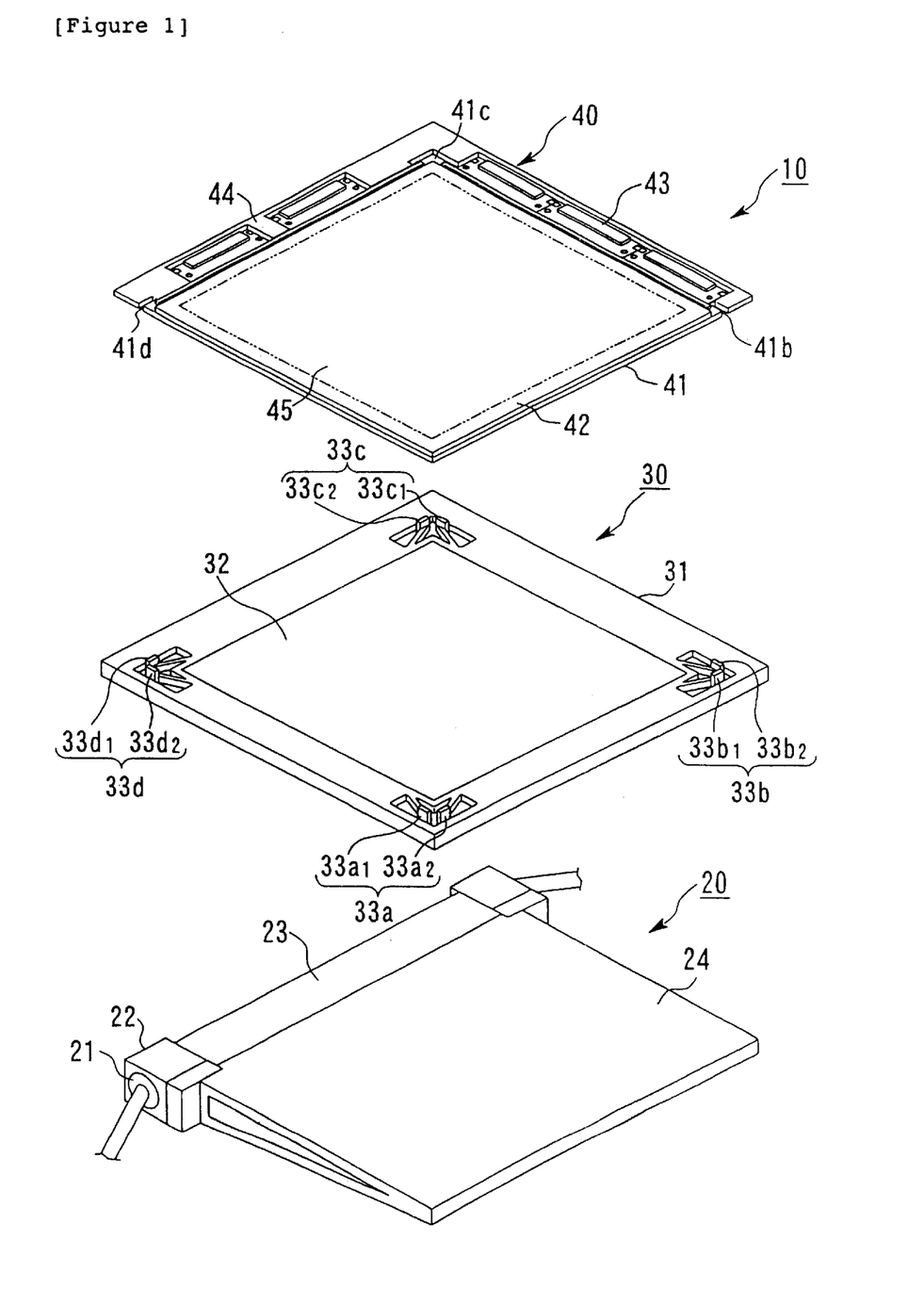
FIG. 1 shows an exploded perspective view of a frame and an LCD panel according to a first embodiment of the present invention.
Figure 2:
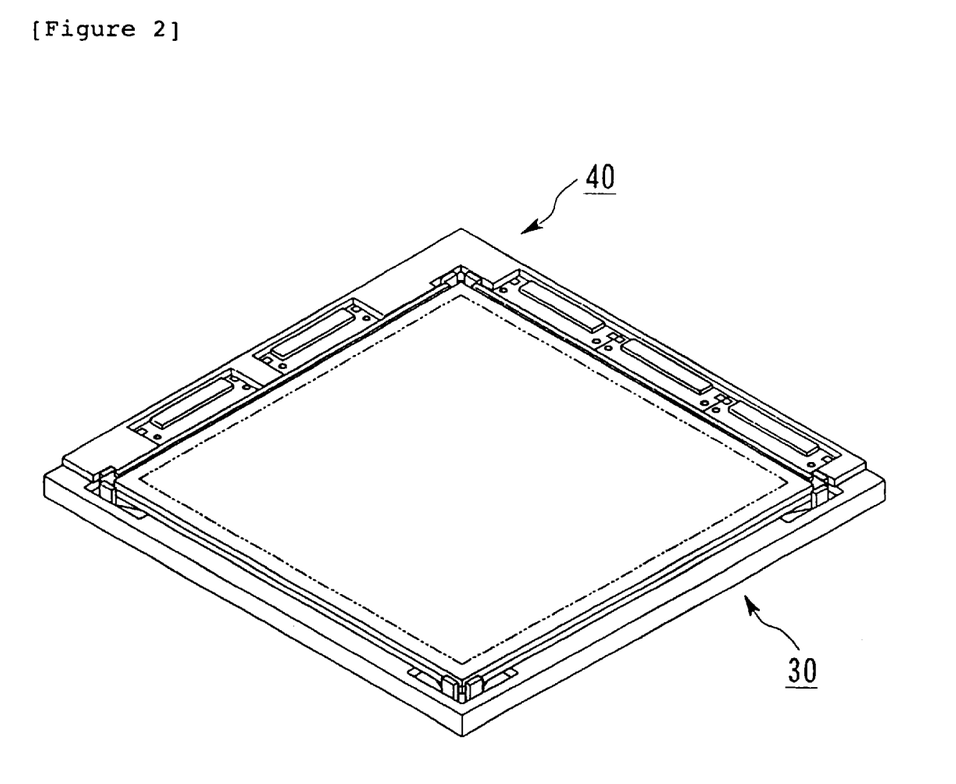
FIG. 2 shows a perspective view of the frame and the LCD panel that are put together in the first embodiment of the present invention.

FIGS. 1 and 2 show preferred embodiments of the present invention for a liquid crystal display (LCD). FIG. 1 shows an exploded perspective view of the LCD and FIG. 2 shows an LCD panel 40 having a circuit board on its circumference and being united with a frame 30 in the LCD 10.

The LCD 10 further has a back light unit 20; a frame 30; and an LCD panel 40; which are disposed from bottom to top therein sequentially.

The back light unit 20 has a lamp 21, which is a light source; a holder 22 for holding the lamp 21; a reflector 23 for reflecting the light from the lamp 21; and a light guide plate 24 for converting a line light source from the lamp 21 to a surface light source.

The frame 30 has a box-like frame body 31 having an opening 32 whose size is equal to the LCD panel 40. At the four corners of this frame body 31 are provided with stoppers 33a to 33d for retaining the LCD panel 40. This frame 30 is formed with such a plastic material as polycarbonate, ABC resin, or the like unitarily with other necessary parts by injection molding.

The LCD panel 40 is composed of a lower first glass substrate 41 and an upper second glass substrate 42 that are laminated. The second glass substrate 42 is positioned on the first glass substrate 41 and its surface area is smaller than that of the first glass substrate 41. A predetermined interstice is formed between those first and second glass substrates 41 and 42. A liquid crystal material is sealed in the interstice. On the first glass substrate 41 are formed drive circuits 43 and 44 for driving liquid crystal material along the two sides.

Because the area of the first glass substrate 41 except for the portion on which the drive circuits 43 and 44 are formed is almost equal to the area of the second glass substrate 42, the drive circuits 43 and 44 are exposed outward when the first and second glass substrates are laminated. On the other hand, a display area 45 (enclosed by a two-dot chain line) is formed at a portion where the first and second glass substrates 41 and 42 are put together.

On the first glass substrate 41 are formed notches 41b, 41c, and 41d so as to fit the stoppers 33b, 33c and 33d of the frame 30 therein when the LCD panel 40 and the frame 30 are laminated. The notches 41b and 41d are rectangular and the notch 41c is like an L-letter in shape.

Figure 3:
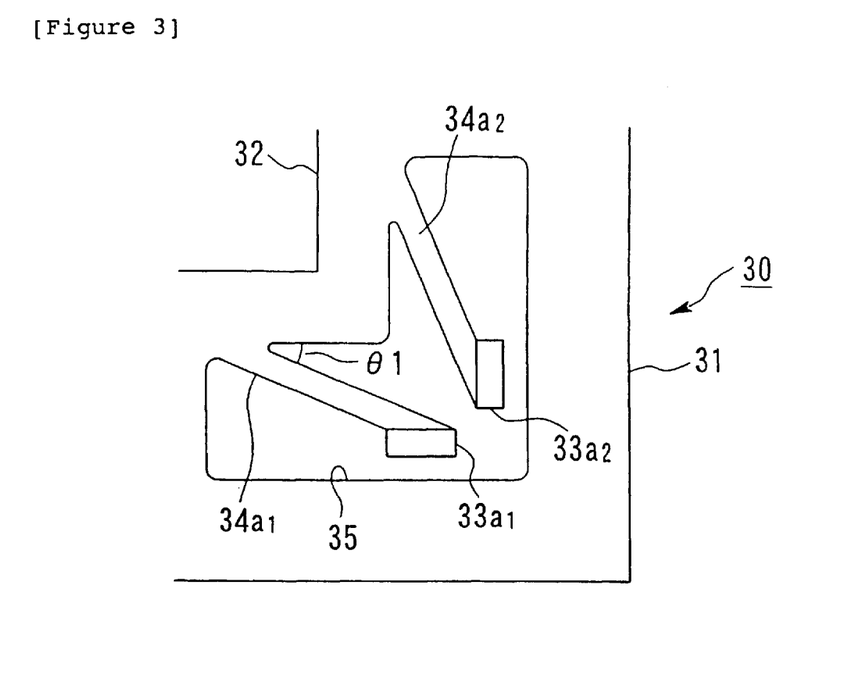
FIG. 3 shows an expanded perspective view of a portion close to stoppers of the frame in the first embodiment of the present invention.
Figure 4:
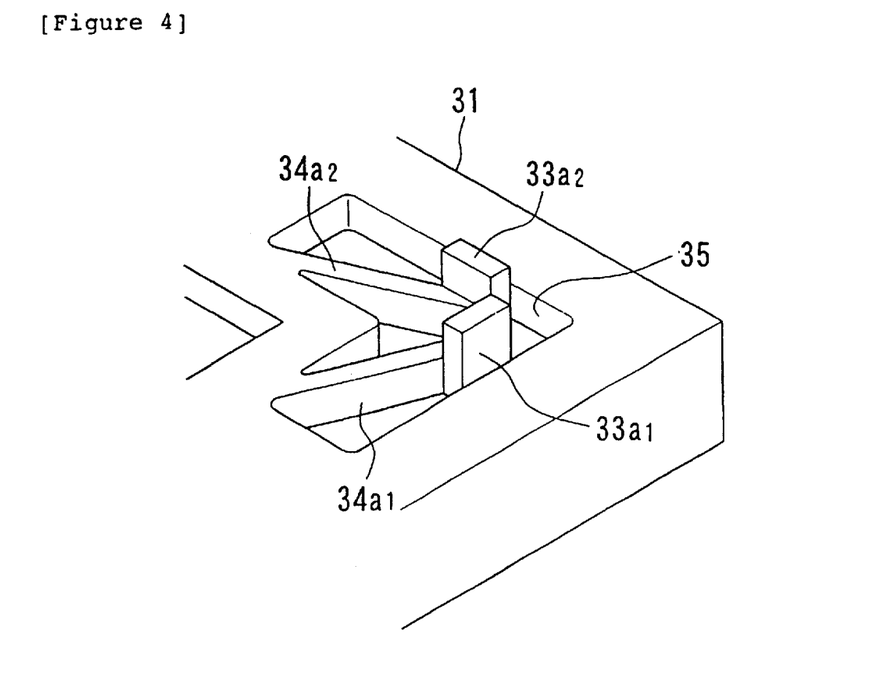
FIG. 4 shows an expanded perspective view of a portion close to stoppers of the frame in the first embodiment of the present invention.

FIGS. 3 and 4 are expanded views of the stoppers 33a1 and 33a2 of the frame 30. FIG. 3 is a top view and FIG. 4 is a perspective view.

As shown in FIGS. 3 and 4, the frame 30 has an L-shaped through-hole 35 formed at each of the corners of the frame body 31 of the frame 30. Oscillating arms 34a1 and 34a2 are formed from the inside wall of the through-hole 35 to a corner and the stoppers 33a1 and 33a2 are formed at free ends thereof so as to be protruded from the surface of the frame body 31.

The oscillating arms 34a1 and 34a2, as well as the stoppers 33a1 and 33a2 are formed from a plastic material unitarily with the frame body 31 through injection molding. Although the oscillating arms 34a1 and 34a2, as well as the stoppers 33a1 and 33a2 can be attached to the frame body 31 after the through-hole 35 is formed in the frame body 31. However, they should preferably be formed unitarily with the frame body as in this embodiment so as to suppress the manufacturing cost.

The oscillating arms 34a1 and 34a2 can be oscillated from the fixed ends in the planar direction of the frame body 31. This oscillating motion causes the stoppers 33a1 and 33a2 to moved in the planar direction of the frame body 31.

The stoppers 33a1 and 33a2 in this embodiment are different from the conventional stoppers 62a to 62d shown in FIGS. 11 and 12 in the following points. At first, although the conventional stoppers 62a to 62d are shaped like an L-letter respectively in the top view, the stoppers 33a1 and 33a2 in this embodiment are shaped like a split L-letter, respectively. Next, the conventional stoppers 62a to 62d are formed just like open-ended beams protruded upward from the frame 62, thereby allowing each of the stoppers to moved as a deflection from around the fixed end due to an external force. Concretely, they are not moved in the planar direction of the frame 62. On the contrary, the stoppers 33a1 and 33a2 in this embodiment can be moved in the planar direction of the frame body 31 as described above. In addition, the stoppers 33a1 and 33a2 in this embodiment can be moved independently of each other and almost orthogonally to each other.

Figure 5:
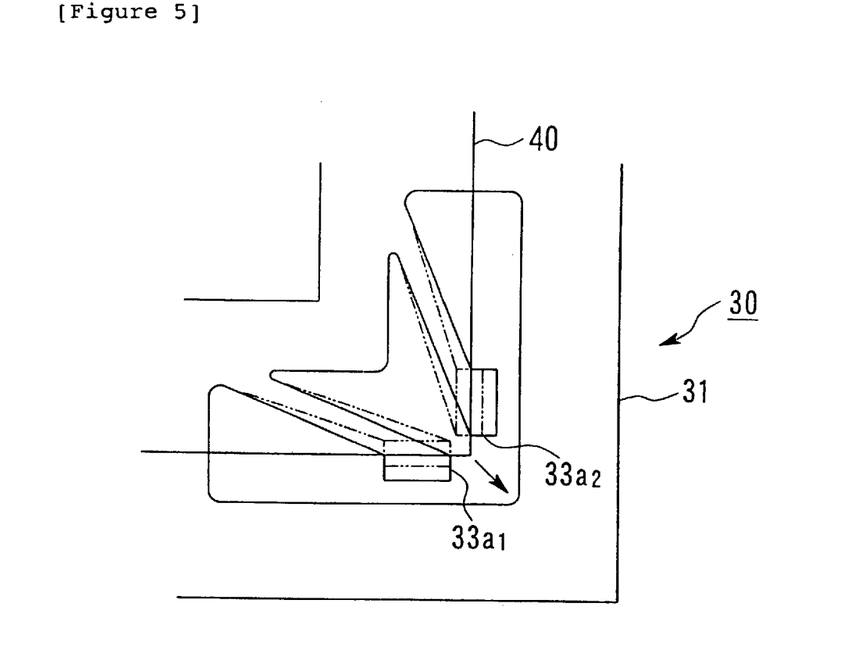
FIG. 5 shows a top view of how the stoppers of the frame are moved in the first embodiment of the present invention.

FIG. 5 shows a portion close to both stoppers 33a1 and 33a2 while the LCD panel 40 is retained in the frame 30. FIG. 5 shows only the circumstance of the LCD panel 40. In FIG. 5, if the LCD panel 40 moves in the direction of the arrow, that is, towards a corner of the frame 30, then the stoppers 33a1 and 33a2 are moved outward of the frame 30 due to the oscillation of the oscillating arms 34a1 and 34a2 from their fixed ends. In FIG. 5, the one-dot chain line denotes the stoppers 33a1 and 33a2 in the free state in which no load is applied to them. The stoppers 33a1 and 33a2 are formed as a rectangular solid respectively so as to retain the LCD panel 40 on a plane. This invention is not limited only to this, however; the stoppers 33a1 and 33a2 may be, for example, cylinder-like.

According to this embodiment, the stoppers 33a1 and 33a2, when applied with a load respectively, can be moved in the planar direction of the frame body 31 as described above. Consequently, even when a vibration/shock is applied to the liquid crystal display (LCD) 10, the vibration/shock can be absorbed effectively by those stoppers 33a1 and 33a2. In addition, even when the manufactured LCD panel 40 is large in size and the clearance to each of the stoppers 33a1 and 33a2 in the free state is negative, the LCD panel 40 can be built in the frame 30 as long as the clearance is not excessively large. Concretely, according to this embodiment, the LCD can absorb such a vibration/shock effectively and compensate a low dimensional accuracy of the frame 30 or the LCD panel 40. This will make it easier to manufacture the LCD. And, this is an advantage of this embodiment.

In this embodiment, it is possible to adjust the allowable stress of the stopper 33a1(a2) if the angle θ1 (FIG. 3) of the oscillating arm 34a1 (34a2) to the frame body 31, as well as the width and thickness of the oscillating arm 34a1 (34a2) are adjusted.

In the first embodiment described above, the oscillating arms 34a1 and 34a2 are formed from the inside wall surface of the through-hole 35 to a corner of the frame body 31. However, this invention is not limited to this and they may also be formed as shown in the second embodiment shown in FIG. 6.

Figure 6:
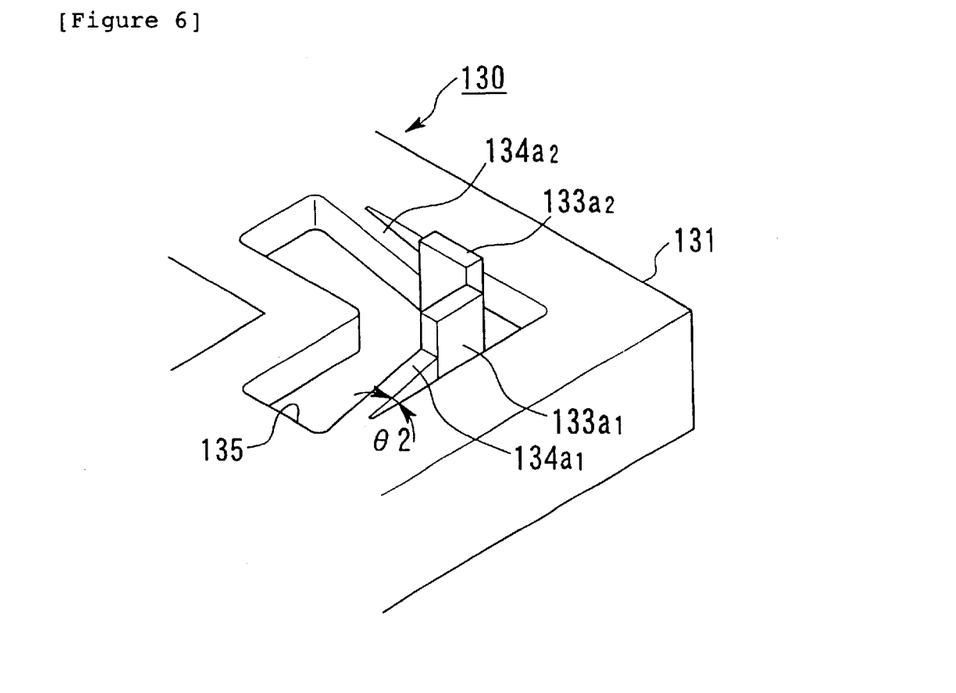
FIG. 6 shows an expanded perspective view of a portion close to stoppers of the frame in accordance with a second embodiment of the present invention.

In the second embodiment of the present invention, the oscillating arms 134a1 and 134a2 are formed from the outside wall surface of the through-hole 135 formed in the frame body 131 to a corner of the frame body 131. And, the stoppers 133a1 and 133a2 are provided at the free ends. Even with such the embodiment, the stoppers 133a1 and 133a2 can work just like the stoppers 33a1 and 33a2 in the first embodiment. Consequently, the second embodiment can obtain the same effect as that of the first embodiment in effective reduction of such an external force as a vibration or shock, as well as easiness for manufacturing the LCD.

If the oscillating arms 34a1 and 34a2 are formed from the inside wall surface of the through-hole 35 to a corner of the frame body 31 as described in the first embodiment, the following advantages will be obtained. The advantages are different in the first and second embodiments.

In the second embodiment, the angle θ2 shown in FIG. 6 must be larger than that in the first embodiment so as to give a predetermined strength to the oscillating arms 134a1 and 134a2 respectively. Consequently, the stoppers 133a1 and 133a2 are positioned further inside the frame body 131. This means that the LCD panel 40 can be reduced in size more than that of the first embodiment when the same sized frame body 131 is used in both embodiments. On the contrary, according to the first embodiment, the stoppers 33a1 and 33a2 are positioned further outside the frame body 31 even when the angle θ1 between each of the oscillating arms 34a1 and 34a2 and the inside wall surface. This means that the LCD panel 40 to be retained can be made larger when the same sized frame body 31 is used in both embodiments.

Figure 7:
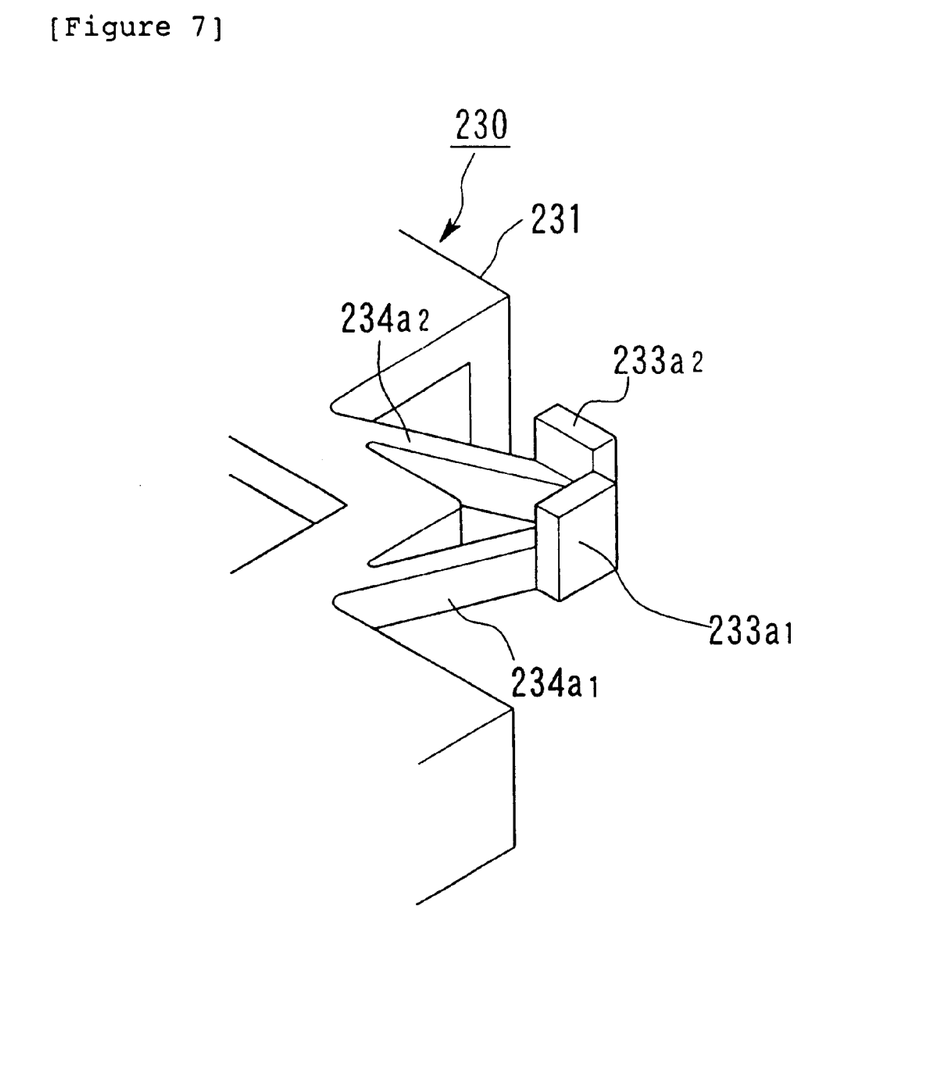
FIG. 7 shows an expanded perspective view of a portion close to stoppers of the frame in accordance with a third embodiment of the present invention.

Although the through-hole 35 is formed in the frame body 31 and the oscillating arms 34a1 and 34a2 are formed in the through-hole 35 in the first embodiment, the present invention is not limited only to that, FIG. 7 shows a variation.

The frame 230 shown in FIG. 7 has two oscillating arms 234a1 and 234a2 and forms the stoppers 233a1 and 233a2 at the free ends of the oscillating arms 234a1 and 234a2. This is the same as the first embodiment. The third embodiment shown in FIG. 7 differs from the second embodiment in that each corner of the frame body 231 is cut like an L-letter and each of the oscillating arms 234a1 and 234a2 is extended from the side wall cut like the L-letter.

With the structure of the frame body 231 shown in FIG. 7, the stoppers 233a1 and 233a2 can be disposed at the extreme outer circumference of the frame body 231. Consequently, when it is expected to use the same sized frame body 231 in both embodiments, the LCD panel 40 to be retained can be made larger than that in the first embodiment. And, when it is expected to retain the same sized LCD panel 40 in both embodiments, the frame body 231 can be reduced in size more than that in the first embodiment.

In the first embodiment, two stoppers 33a1 and 33a2 are disposed at a corner of the frame body 31 and each of the two stoppers 33a1 and 33a2 can be moved in the planar direction of the frame body 31. This invention, however, is not limited only to this disposition of the stoppers 33a1 and 33a2, FIG. 8 shows a variation.

Figure 8:
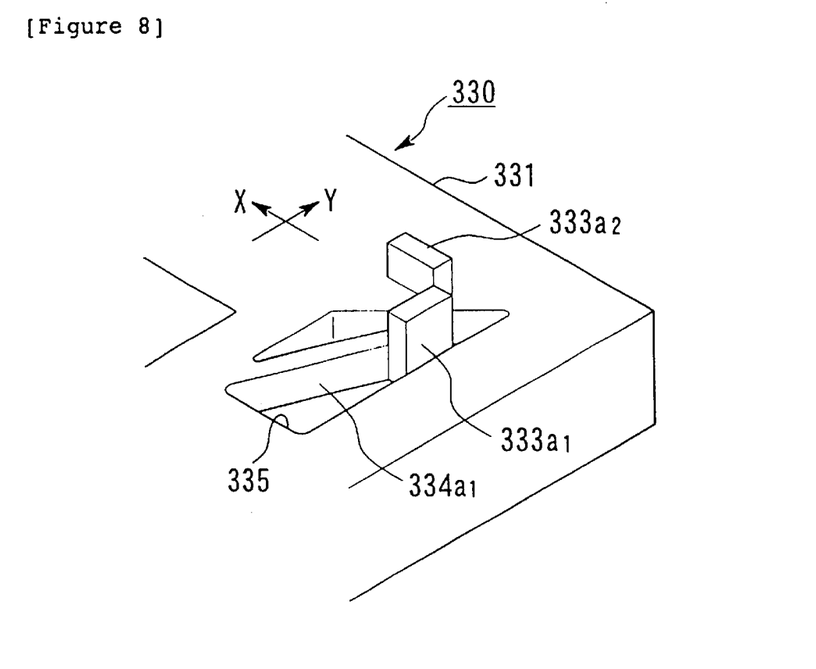
FIG. 8 shows an expanded perspective view of a portion close to stoppers of the frame in accordance with a fourth embodiment of the present invention.

The frame 330 in the fourth embodiment shown in FIG. 8 is the same as that in the third embodiment in that the frame 330 has two stoppers 333a1 and 333a2. The frame 330 in the fourth embodiment is different from that in the third embodiment because of one stopper 333a1 provided at the oscillating arm 334a1 and the other stopper 333a2 formed so as to be protruded from the surface of the frame body 331. Just like the conventional stoppers 62a to 62d, the stopper 333a2 is fixed in the horizontal direction of the frame body 331.

This fourth embodiment is effective when the LCD panel 40 to be retained can be moved in the X axial direction (FIG. 8) but cannot be moved in the Y axial direction.

In the first embodiment, the oscillating arms 34a1 and 34a2 are the same in width. However, the present invention is not limited only to that, FIG. 9 shows a variation.

Figure 9:
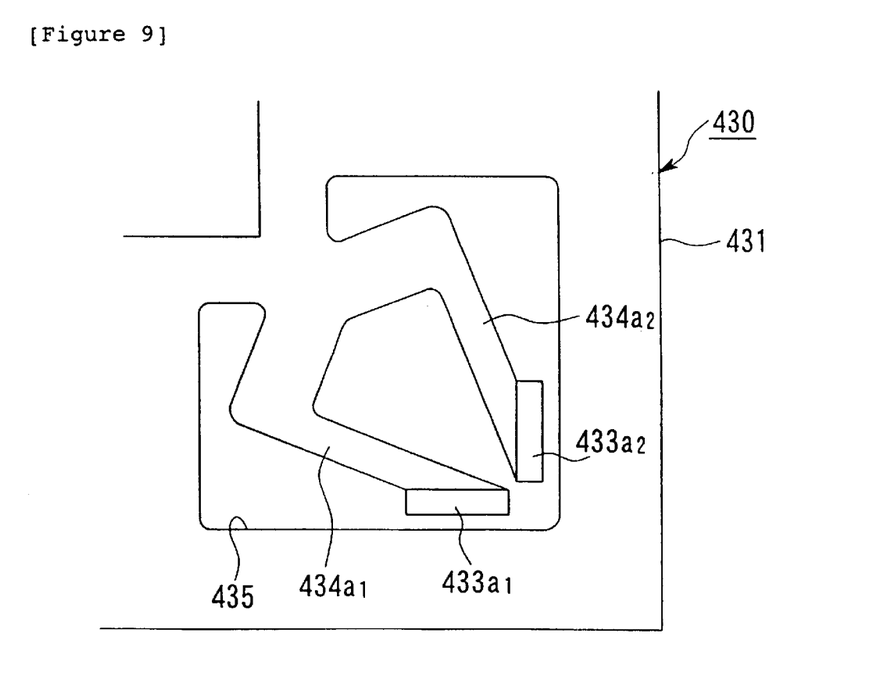
FIG. 9 shows an expanded perspective view of a portion close to stoppers of the frame in accordance with a fifth embodiment of the present invention.

The frame 430 in the fifth embodiment shown in FIG. 9 has two oscillating arms 434a1 and 434a2 and stoppers 433a1 and 433a2 are provided at the free ends of the oscillating arms 434a1 and 434a2 respectively. The frame 430 is the same as that in the first embodiment in this aspect. In the fifth embodiment shown in FIG. 8, however, the oscillating arms 434a1 and 434a2 are bent respectively and the width of each of those arms 434a1 and 434a2 is asymmetrical about the bend; the width at the fixed end side is narrower than the width at the free end side. Concretely, the cross sectional area of the oscillating arms 434a1 and 434a2 are varied respectively in the longitudinal direction.

If two oscillating arms 434a1 and 434a2 are formed at two different widths just like in this fifth embodiment, a given mechanical strength can be set for the movement of the stoppers 433a1 and 433a2. It is also possible to vary the two oscillating arms 434a1 and 434a2 in shape from each other, although they are the same in this embodiment.

In the first embodiment, stoppers 33a to 33d are formed at all the four corners of the frame 30. This means that the first embodiment regards the resistance of the LCD panel 40 to vibration/shock as important more than the positional accuracy thereof.

Figure 10:
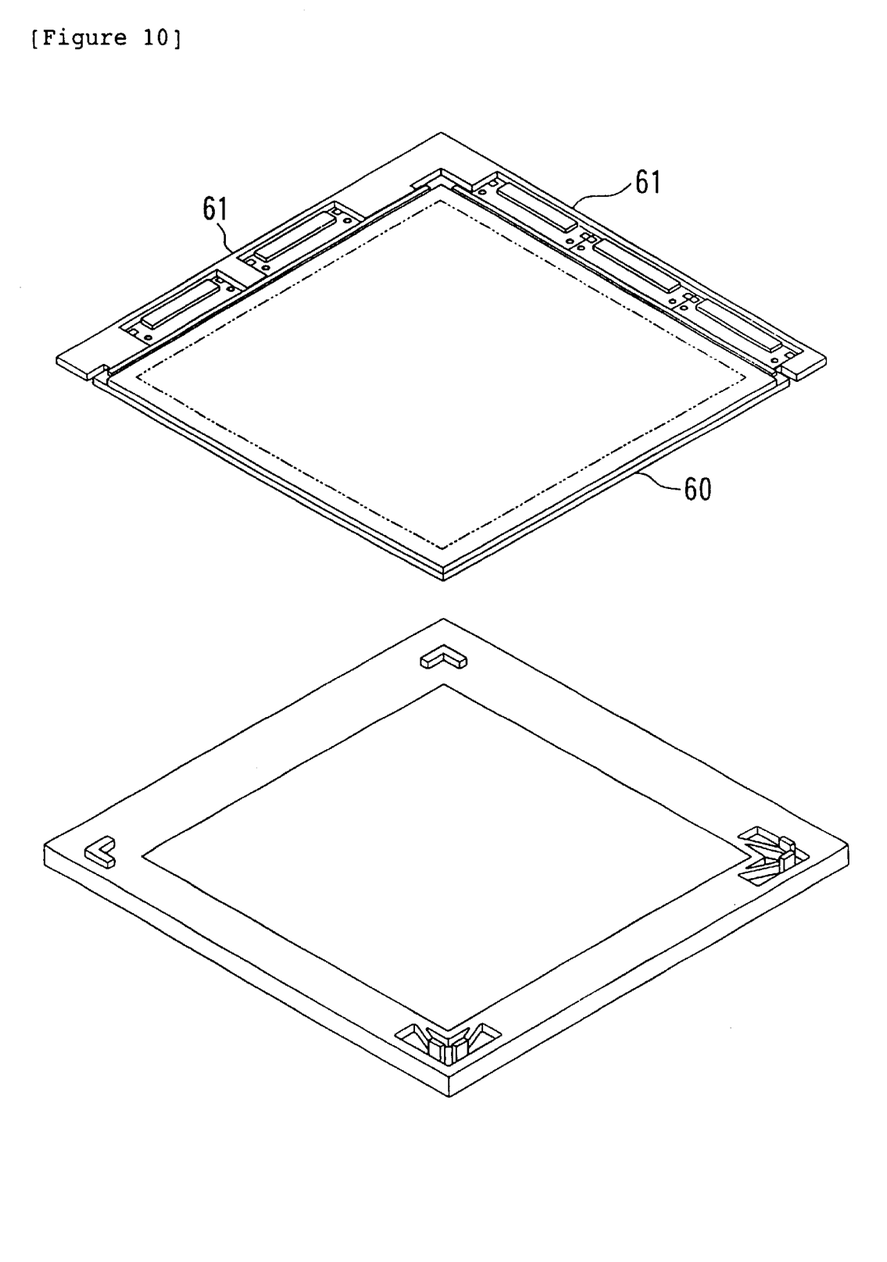
FIG. 10 shows an exploded perspective view of a frame and an LCD panel in accordance with a sixth embodiment of the present invention.

However, the present invention is not limited only to the concept. Positions of those stoppers can be decided freely by which is regarded as more important, the positional accuracy or the resistance of the LCD panel 40 to vibration/shock. For example, if the positional accuracy of the LCD panel 40 is also regarded as important, an conventional L-letter shaped stopper may be fixed at one corner and the stoppers of the present invention may be provided at other three corners. And, in addition to the positional accuracy of the LCD panel 40, the resistance to vibration/shock in one direction is regarded especially as important, the stoppers of the present invention may be provided at two corners and conventional fixed L-letter shaped stoppers may be provided at other two corners as shown in FIG. 10.

Although stoppers provided at a corner of the frame body have been described in the above embodiments, the present invention is not limited only to the stoppers provided at the corner; those stoppers may be provided at any places where the LCD panel 40 can be retained. For example, they may be provided at a place between corners so as to reduce the vibration/shock to the LCD panel 40 more effectively.

As described above, according to the present invention, it is possible to provide a frame that can retain an LCD panel even when the dimensional accuracy of both frame and LCD panel is low. According to the present invention, it is also possible to provide a frame that can absorb a vibration/shock more effectively than the conventional frame without causing the display area to be narrowed even when a large vibration/shock is applied to such an object portable device as a lap-top personal computer.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A frame for retaining display panel, comprising:
    a frame body for placing said panel;
    an arm oscillatably attached in a planar direction to said frame body; and
    a stopper attached to said arm so as to be protruded from said frame body and function to restrict a movement of said panel in its planar direction,
    wherein a void is formed at said frame body so as to dispose said arm therein and said arm is extended from a sidewall surrounding said void.

2. The frame according to claim 1, wherein said arm and said stopper are formed unitarily with said frame body.

3. The frame according to claim 1, wherein the cross-sectional area of said an is varied in its longitudinal direction.

4. A liquid crystal display (LCD), comprising:
    an LCD panel comprising of two laminated glass substrates;
    a back light unit for irradiating a light to said LCD panel; and
    a frame disposed between said LCD panel and said back light unit and used to hold said LCD panel and restrict the movement of said LCD panel in its planar direction,
    wherein said frame comprises:

a rectangular frame body having a predetermined thickness;

an arm formed at one of corners of said frame body unitarily with said frame body so that one end becomes a fixed end and the other end becomes a free end with respect to said frame body within a range of said thickness of said frame body; and a movable stopper erected at said free end side of said arm and used to restrict said movement of said LCD panel.

5. The liquid crystal display (LCD) according to claim 4, wherein said arm is formed so that said fixed end is positioned inside said frame body and said free end is positioned outside said frame body.

6. The liquid crystal display according to claim 4, wherein said movable stopper is disposed on one of a pair of said glass substrates of said LCD panel.

7. The liquid crystal display (LCD) according to claim 4, wherein said movable stopper, in cooperation with said fixed stopper fixed to said frame body and erected from said frame body, functions to restrict said movement of said LCD panel.

* * * * *